United States Patent [19]
Whiteis

[11] Patent Number: 5,749,081
[45] Date of Patent: May 5, 1998

[54] SYSTEM AND METHOD FOR RECOMMENDING ITEMS TO A USER

[75] Inventor: David E. Whiteis, Germantown, Md.

[73] Assignee: Firefly Network, Inc., Cambridge, Mass.

[21] Appl. No.: 417,961

[22] Filed: Apr. 6, 1995

[51] Int. Cl.⁶ .................................................. G06F 17/30
[52] U.S. Cl. .................................. 707/102; 707/2; 707/4
[58] Field of Search .................................. 395/201, 216, 395/226, 227, 601, 607, 962, 613, 602, 604, 762; 235/375; 364/419

[56] References Cited

U.S. PATENT DOCUMENTS

| | | | |
|---|---|---|---|
| 4,775,935 | 10/1988 | Yourick | 345/357 |
| 4,870,579 | 9/1989 | Hey | 364/419 |
| 4,996,642 | 2/1991 | Hey | 705/27 |
| 5,237,157 | 8/1993 | Kaplan | 235/375 |
| 5,592,375 | 1/1997 | Salmon et al. | 395/207 |

OTHER PUBLICATIONS

The Game Grotto; Arnold Schwarzenegger; Internet Movie Database;http://us.imdb.com/cache/person-ratings/a 140622; pp. 1–6; Jan. 1990.

*Primary Examiner*—Thomas G. Black
*Assistant Examiner*—Diane Mizrahi
*Attorney, Agent, or Firm*—Testa, Hurwitz & Thibeault, LLP

[57] ABSTRACT

A system and method for assisting a consumer in selecting items from a master list of available items, when the consumer has already sampled some of the available items, and indicated a favorable response to a subset of the sampled items by including the names of the favored items on an input list. The system recommends items from the master list based on the input list of favored items. These recommended items having a high probability of appeal to the consumer. The accuracy of the recommendations is achieved by calculating degrees of similarity between different items on the master list. The similarities are calculated by storing how often the items are linked together, by appearing together on the input lists of previous consumers. Each use of the system by a consumer then increases the accuracy of the system, since one more input list is added to the table of input lists captured from previous consumers.

14 Claims, 8 Drawing Sheets

Sample Input Table

| Input Items |
|---|
| Star Wars |
| The Terminator |
| Twelve O'Clock High |

202 → Star Wars
203 → Twelve O'Clock High
201

Fig. 6

Sample Names table (partial)

| Movie | Star |
|---|---|
| ... | |
| Star Trek I | William Shatner |
| Star Wars | Mark Hamill |
| Star Witness | Walter Huston |
| Star! | Julie Andrews |
| Starcrash | Caroline Munro |
| Stardust Memories | Woody Allen |
| Starflight | Lee Majors |
| ... | |
| The Ten Commandments | Charlton Heston |
| The Tenant | Roman Polanski |
| The Tenth Month | Carol Burnett |
| The Terminator | Arnold Schwarzenegger |
| The Texas Rangers | Fred MacMurray |
| The Thief of Bagdad | Douglas Fairbanks |
| The Thing | Kurt Russell |
| ... | |

252 → Star Wars
253 → The Terminator
205

Fig. 7

Sample Links table (partial)

| {LINK ITEMS & MATCHES} | | |
|---|---|---|
| ... | | |
| Airplane! | When Harry Met Sally | 12 |
| Airplane! | Test Pilot | 4 |
| Casablanca | The Pride of the Yankees | 22 |
| Casablanca | Gone With the Wind | 332 |
| Star Wars | Back to the Future | 120 |
| Star Wars | The Empire Strikes Back | 38 |
| Star Wars | The King and I | 11 |
| Star Wars | The Sound of Music | 25 |
| The Terminator | Back to the Future | 122 |
| The Terminator | Top Gun | 57 |
| The Terminator | Total Recall | 231 |
| Top Gun | Total Recall | 72 |
| ... | | |

Fig. 8

Sample LinksTo table (partial)

| LinksTo Item | LinksTo Weight |
|---|---|
| ... | |
| The Empire Strikes Back | 1120 |
| The King and I | 135 |
| The Sounds of Music | 650 |
| The Terminator | 880 |
| Top Gun | 391 |
| Total Recall | 565 |
| ... | |

Fig. 9

Sample Results table

| Result Item | Result Weight | Adjusted Weight | TLinks |
|---|---|---|---|
| Total Recall | 231 | .41 | 565 |
| Back to the Future | 242 | .27 | 901 |
| Top Gun | 57 | .15 | 391 |
| The King and I | 11 | .08 | 135 |
| The Sound of Music | 25 | .04 | 650 |
| The Empire Strikes Back | 38 | .03 | 1120 |

Fig. 10

Sample Input Pairs table

| Input Pairs | |
|---|---|
| Star Wars | The Terminator |
| Star Wars | Twelve O'Clock High |
| The Terminator | Twelve O'Clock High |

SYSTEM AND METHOD FOR RECOMMENDING ITEMS TO A USER

BACKGROUND OF THE INVENTION

1. Field of the Invention

This invention relates to a system and method of recommending items to a user, to which the user is likely to have a positive subjective response. The system recommends to the user items which have not yet been sampled by the user, based on a list of items already sampled by the user for which the user has indicated a positive response.

2. Description of Related Art

There are an ever-increasing number of items available for purchase by users that are selected based on subjective reactions. Many of these items, such as music recordings and movies on video tape, require some investment in time and money before a user can decide if the purchase was one that agrees with the user's particular taste.

The coming advent of video movies on demand through interactive cable TV, and the likely introduction of digital audio on demand through the same cable links that make interactive TV possible, and many other technology-related changes, introduce a growing need to help users select from the many possible choices available to them in the entertainment and electronic information fields.

There is known in the related art a system that allows recommendations to be made to users, based both on items in a list of possible selections that the user has already indicated an interest in, and on other information such as age, gender, economic bracket, etc. Some video tape rental stores are already generating suggestions on the receipt for a customer's current rental, informing the user that if he likes the rented movie, he may also wish to rent some other specified movie at a future time. These systems are set up by hand by the managers of the rental store, however. In other words, someone in the management of the store has to know the movies in question, including the movies that might be rented and the movies that would be recommended. This process is time consuming and does not work well, since it depends on the judgment call of one or a few of the managers of the rental store company.

U.S. Pat. Nos. 4,996,642 and 4,870,579 to Hey describe a system for recommending items based on ratings of the items. However, Hey uses a complicated algorithm to determine the items that are to be recommended. This fact, in turn, would require any computer system based on the Hey concept to be much more complicated and slower than the present invention, including requiring between 10 and 100 times as much computer hard-disk storage space. Further, the Hey system requires that the user rate each individual item in his input list on a predetermined scale (e.g., 1 to 12 in the disclosed example). This prevents such a system from being capable of automatic, point-of-sale recommendations. Lastly, and more fundamentally, the Hey system can predictively determine how well the person will like an item when the user queries the system as to how well that person will like that particular item. However, the Hey system cannot recommend items which the person does not know of, and does not query the system about.

SUMMARY OF THE INVENTION

It is therefore an object of the present invention to provide a system and method for automatically and accurately predicting the subjective reaction of a person to items not yet sampled by that person. In other words, it is an object of the present invention to make recommendations. The recommendations are based on other items previously sampled by that user for which the user has indicated a positive reaction. Simply put, the system's typical input for a particular user is a list of that user's current favorite items. The operation of the system is based on the premise that any time two items appear together on a user's list of favorite items, there is a chance that those two items are somehow similar to each other. The more times that two items are "linked" together by appearing together on different user's lists of favorite items, the greater the chance that those two items are very similar in the sense that someone who liked one of the items would be likely to enjoy the other item also. The system, also referred to as a Similarities Engine, tracks these links in a table, and uses this table as the basis of the recommendations.

The present invention improves over existing recommending systems because it does not require any manual setup of the relationships between the items that are available for recommendation. Existing systems require a person who is knowledgeable about most or all of the available items to determine and input into the system the relationships among the available items. In other words, the person setting up existing systems must input the condition that if a user enjoys or purchases one particular item, the user may enjoy or wish to purchase one or more other particular related items. This setup must be performed for all of the items that the existing systems use as a basis for making recommendations. Not only is this setup process time consuming and difficult, but it is also not accurate, as it depends on the opinions of just one or a few people who set up the system.

The present invention does not require such a setup process, because each user of the system is the source of the data that determines the links, or relationships, between the items in a master list.

DETAILED DESCRIPTION OF THE PREFERRED EMBODIMENT

In general, the system makes recommendations based upon how many times an item known to the user is linked with other items not known to the user. The user chooses the items he knows he likes from a master list of items. The system processes the selections by searching through a list of items that are paired or linked by association (i.e., from data generated by other users based on those other user's likes) with the items chosen by the user, along with the number of times each of the elements of the respective pairs appear together. The items that are most frequently linked with the user's selected items are stored in a form that can be displayed to the user as recommended items.

Figure 7:
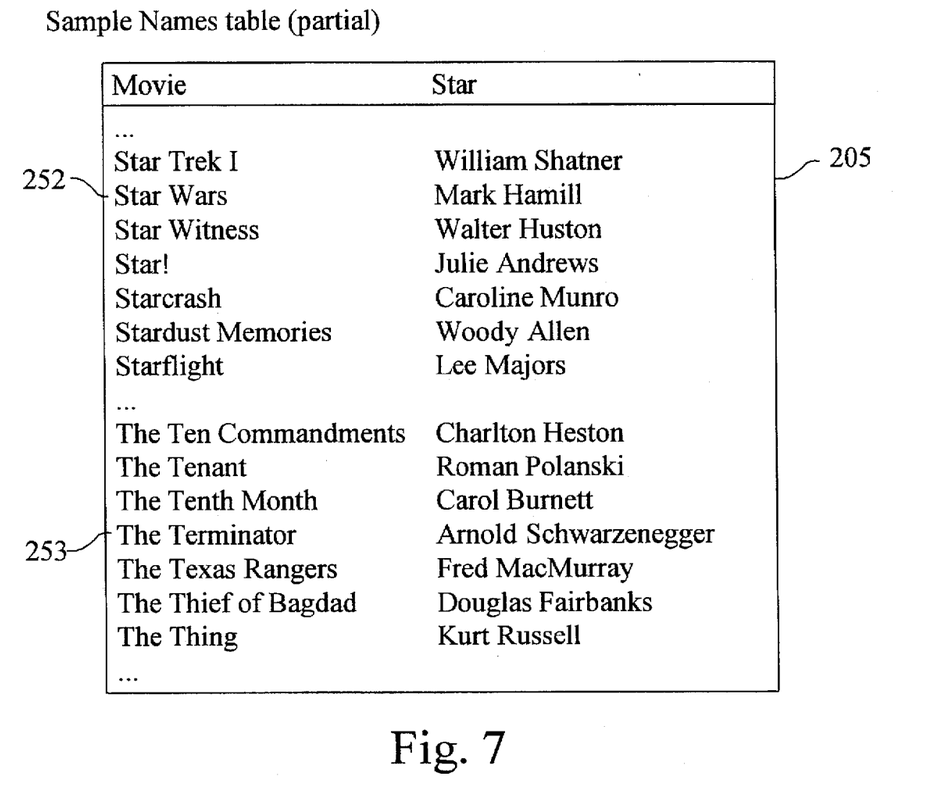
FIG. 7 shows a sample NAMES table, which is the list of items that the user would choose from when creating his INPUT table.

The present invention employs data stores to store the information necessary to formulate recommendations. These data stores are described below, as tables, although other implementations can also be used. The NAMES table 251, shown in FIG. 7, lists the overall population of known items. As shown in FIG. 7 an item can be identified by one or more attributes. For example, movies can be identified by title or star, or some other characteristic information. An item can also identified by a combination of the above attributes. For example, two different movies which happen to have the same title, but having different star artists, could be identified by a combination of the movie title and the name of the star of the movie. The NAMES table 251 can be used as a means for assisting the user in creating an INPUT table 201, which is described below.

Figure 6:
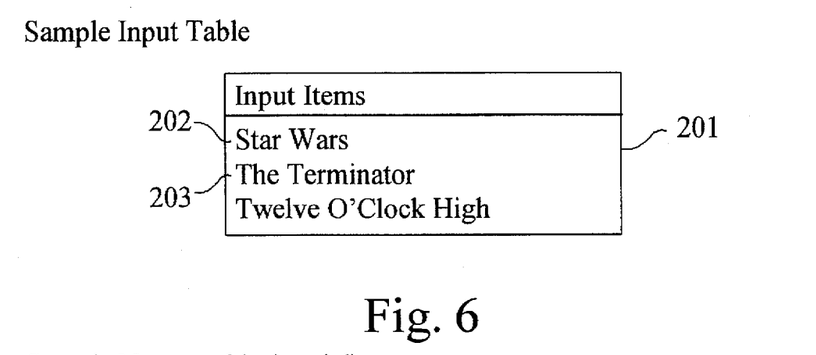
FIG. 6 shows a sample INPUT table, which is in this case a list of three items that a user might enter as input to the system, describing the user's current favorite items.

INPUT table 201, shown in FIG. 6, stores identifying information about items selected by the user. For example, the user could select movie titles from NAMES table 251 corresponding to movies that the user likes.

Figure 8:
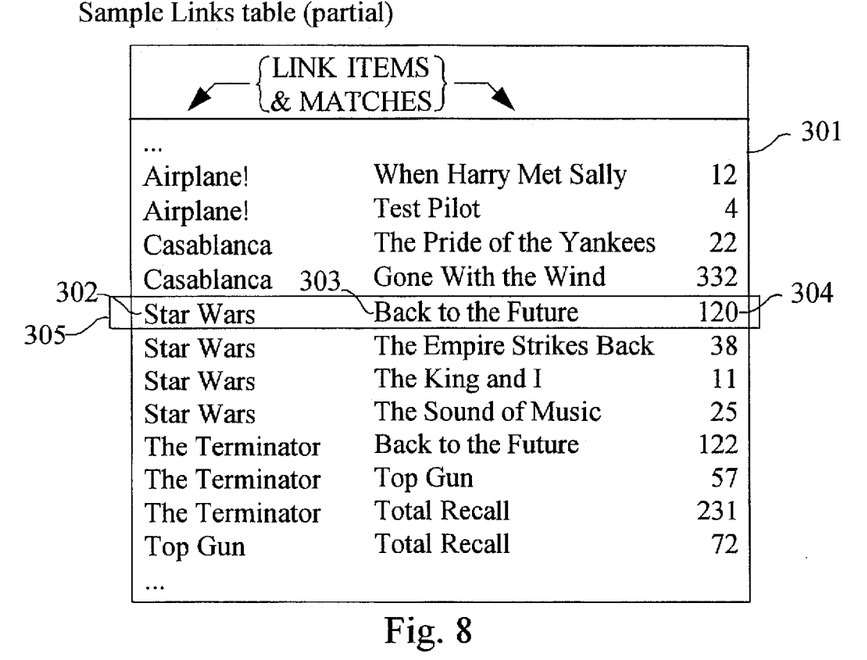
FIG. 8 shows a sample LINKS table, which is where all of the INPUT tables gathered from previous users of the system would be collected and condensed for use in making future recommendations.

A LINKS table 301, shown in FIG. 8, stores information linking an item to another item, both of which a user has indicated as liking. Further, a Link Weight 304 is also stored for each pair of linked items, indicating the number of times users have identified the two items as being liked. In other words, each link, or pair of items, has a weight indicating how many times users have identified that particular pair, or link, as being two of their favorites.

Figure 9:
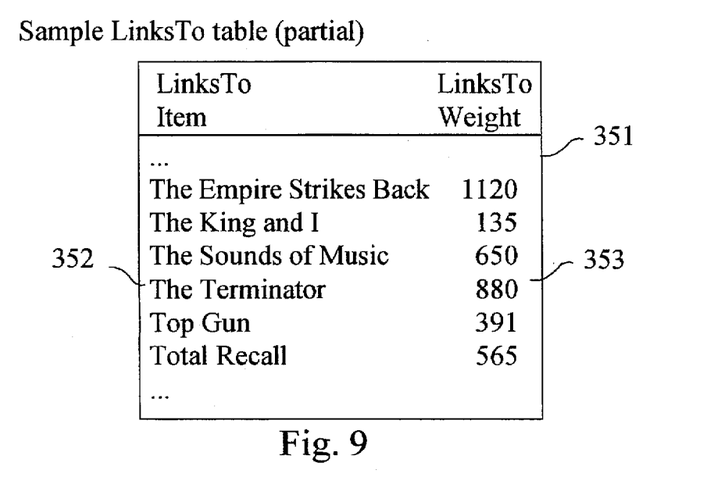
FIG. 9 shows a sample LINKSTO table, which is used to store the total number of times individual items have been linked to other items in the NAMES table.

A LINKSTO table 351, shown in FIG. 9, stores for each item in the LINKS table 301 a LinksTo Weight, representing the sum of the Link Weights for all of the links associated with an item.

Figure 10:
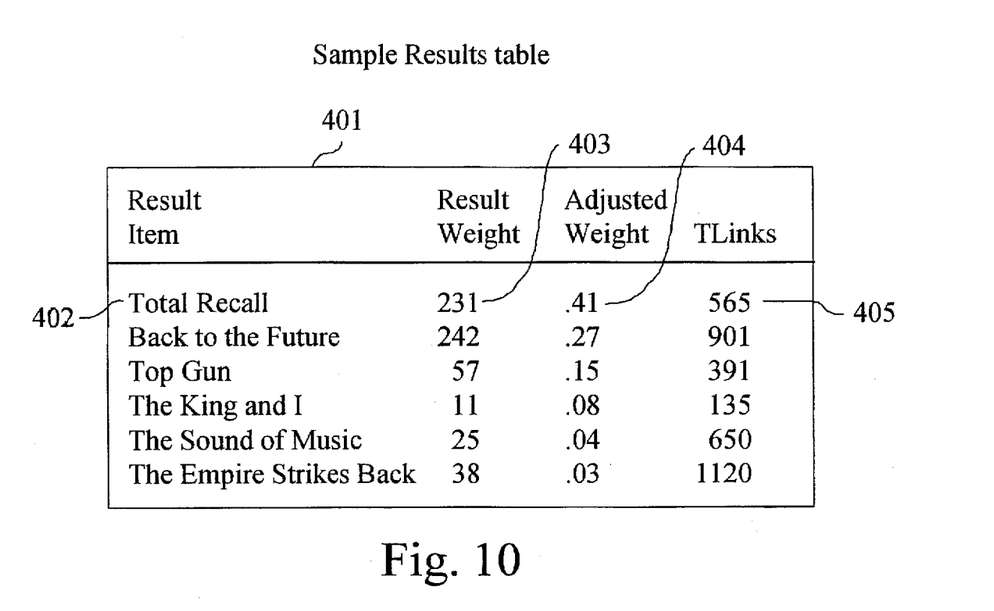
FIG. 10 shows a sample RESULTS table, which is the results that would be generated if the sample INPUT table in FIG. 6 was entered into an implementation of the invention that used the sample NAMES and LINKS tables in FIGS. 7 and 8.

A RESULTS table 401, shown in FIG. 10, stores the results generated by the present invention. Included in RESULTS table 401 is the Result Item, a Result Weight which is the sum of the Link Weights for each of the matches found, a TLinks field which is the sum of the weights for all links associated with a Result Item, and an Adjusted Weight which is generated from the Result Weight and the TLinks. For example, the Adjusted Weight can be calculated by dividing the Result Weight by TLinks.

Figure 11:
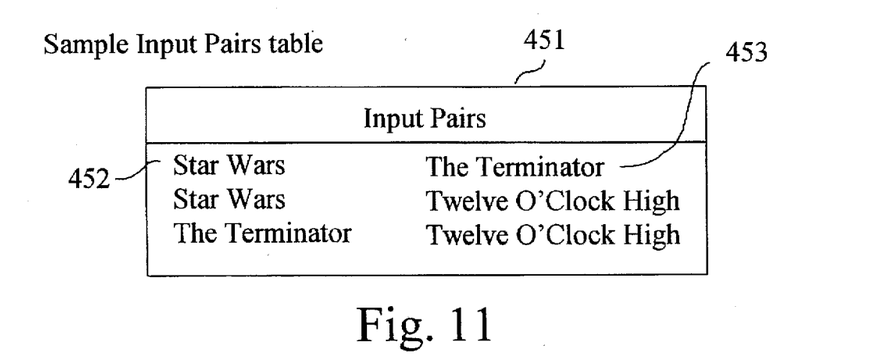
FIG. 11 shows a sample INPUT PAIRS table, which is generated as a temporary table as part of the processing of the steps shown in FIG. 4.

A INPUT PAIRS table 451, shown in FIG. 11, stores the set of pairs of items generated from the items listed in INPUT table 201.

Figure 1:
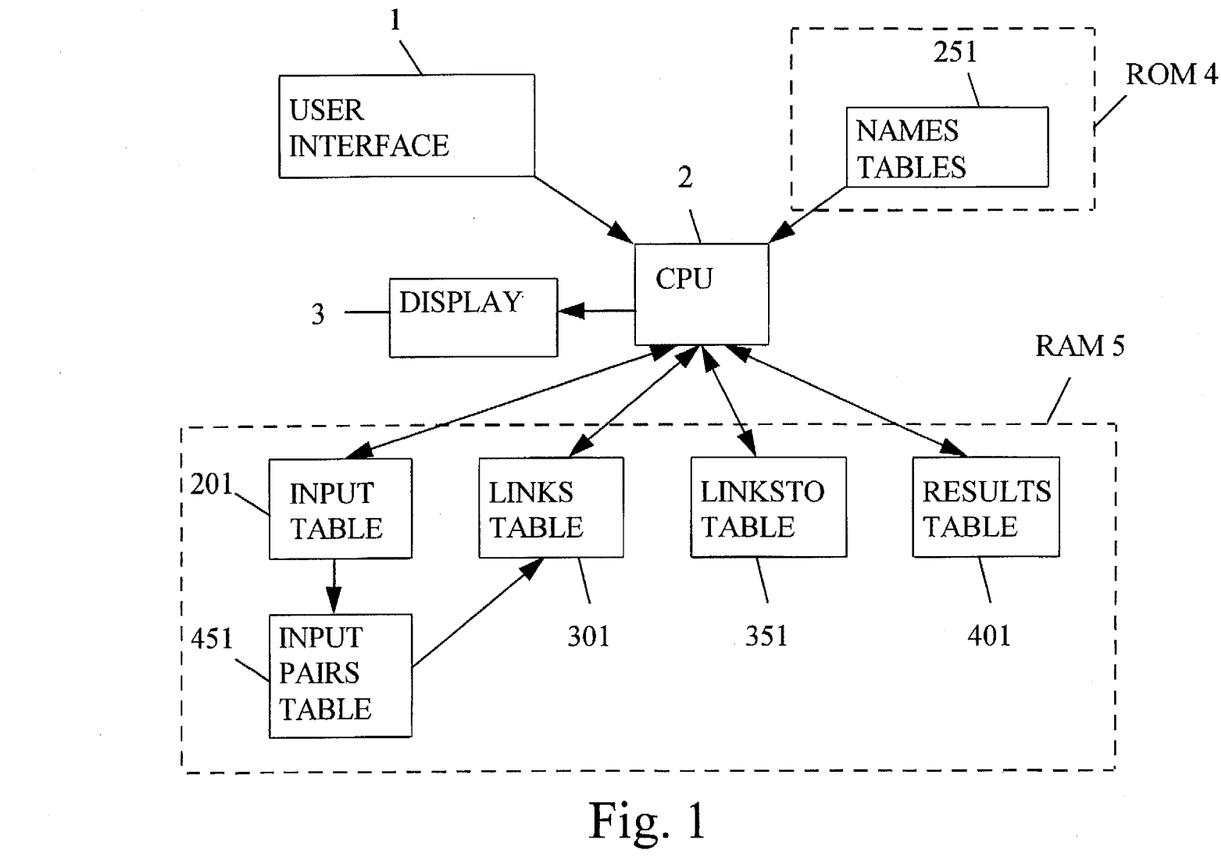
FIG. 1 shows a system overview, including the hardware components, the user interface and the six major data stores, or tables, required to implement the system.

FIG. 1 is a block diagram of the overall system for making recommendations to a user according to a preferred embodiment of the invention. FIG. 1 shows an overview of the system components, including the hardware, user interface and the tables used by the system. A processor 2, such as a CPU, controls the system by accepting input for a user via a user interface 1, such as a computer keyboard. The NAMES table 251, as shown in FIG. 7, can be used by processor 2 to display on display 3 a list of items, such as by title and/or by a star artist's name, in order to facilitate a user selecting items to input. The NAMES table 251 can be stored in a read only memory (ROM) device 4, although other storage devices could be used.

Once a user inputs desired items, these items are stored in the INPUT table 201 as Input Items, under control of the processor 2. Recommendations are determined based on the Input Items, by processor 2 generating a INPUT PAIRS table 451, and employing the LINKS table 301 and LINKSTO table 351. The recommendations are stored as Result Items in the RESULTS table 401. Each of the above tables can be stored in a memory, such as a random access memory (RAM) 5. However, other storage mediums could be used. Processor 2 then reads and sorts the Result Items in RESULTS table 401 based on the adjusted weights of the Result Items, and displays the sorted Result Items on display 3. Of course, other forms of output can also be used, such as by printing the information, etc.

Figure 2:
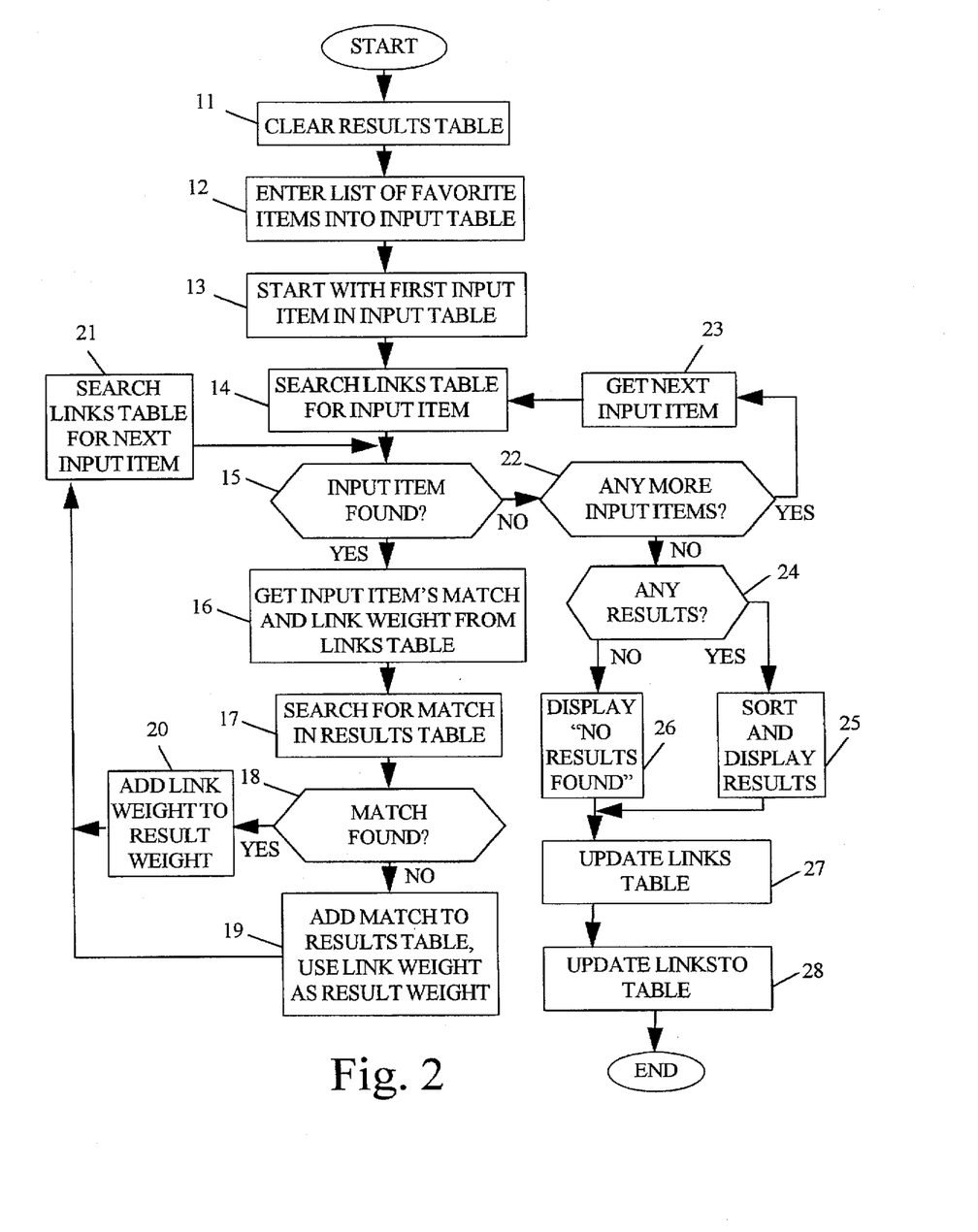
FIG. 2 shows a flowchart of the system operation, and describes how user input is gathered, processed, and the resulting recommendations presented back to the user.

FIG. 2 is a flowchart diagram of the overall system for making recommendations to a user according to a preferred embodiment of the invention. FIG. 2 shows the logic flow that the system follows to accept input from and provide results to a user of the system. The example that is used to illustrate the preferred embodiment is that of a video tape rental store installation, however, it is should be understood that such a system may be used in a variety of other situations where users would benefit from assistance in selecting certain items from a longer list of available choices.

When a user begins operating the system, the first step, step 11, is to clear the RESULTS table 401, as shown in FIG. 10, of any results that may have been left over from a previous user. The system continues to step 12, where the user selects from a list of available items 251 in order to build an INPUT table 201, shown, for example, in FIG. 6. At step 13, the system begins processing the INPUT table 201, starting with the first Input Item 202 in the listed in INPUT Table 201. The system then searches, at step 14, the LINKS table 301, shown for example in FIG. 8, for the first occurrence of the current item from the INPUT table. When the current input item is found to exist in LINKS table 301 in step 15, the process continues in step 16, where the input item's match 303 and the associated link weight 304 for that link 305 are determined. Link weight is determined by the cumulative number of times the two items constituting that link have appeared together in any previous user's INPUT table.

The process continues to step 17, where the system searches for an occurrence of the match in the RESULTS table 401, shown for example in FIG. 10. If the match already exists in the RESULTS table in step 18, then the system continues to step 20, where the weight 304 of the current link, as shown in FIG. 8, is added to the weight 403 of the item located in the RESULTS table. If the current match is not found in the RESULTS table in step 18, the system flow would instead continue to step 19, where a new entry would be added to the RESULTS table, including the current match 303 and its link weight 304.

After either step 19 or 20 is performed, system flow continues to step 21, where the LINKS table is searched for any additional occurrences of that same input item. When all occurrences of all of the input items existing in the LINKS table have been processed in steps 15 through 21, the system will flow from step 15 to step 22. If there are more items in the input list, step 14 is again performed to process the next input item. If there are no more input items to process in step 22, the system continues to step 24. If the RESULTS table 401 is found to contain any entries at this point, then steps 51–58 are performed, which are described in detail in the following paragraph. If no results were found for presentation to the user in step 24, step 26 would instead be performed, where a message would be presented to the user indicating that no results were found to display. Regardless of whether step 25 or step 26 was performed after step 24, system flow would continue to step 27 then step 28. Upon reaching step 27, all steps relating to accepting input from the user, processing the input, generating results, and displaying the results are finished. Steps 27 and 28 consist of steps that integrate the input provided by the user in step 12 into the LINKS table 301 and the LINKSTO table 351 to improve the operation of the system for subsequent users, and are described in detail in following paragraphs.

SORT AND DISPLAY RESULTS

Figure 3:
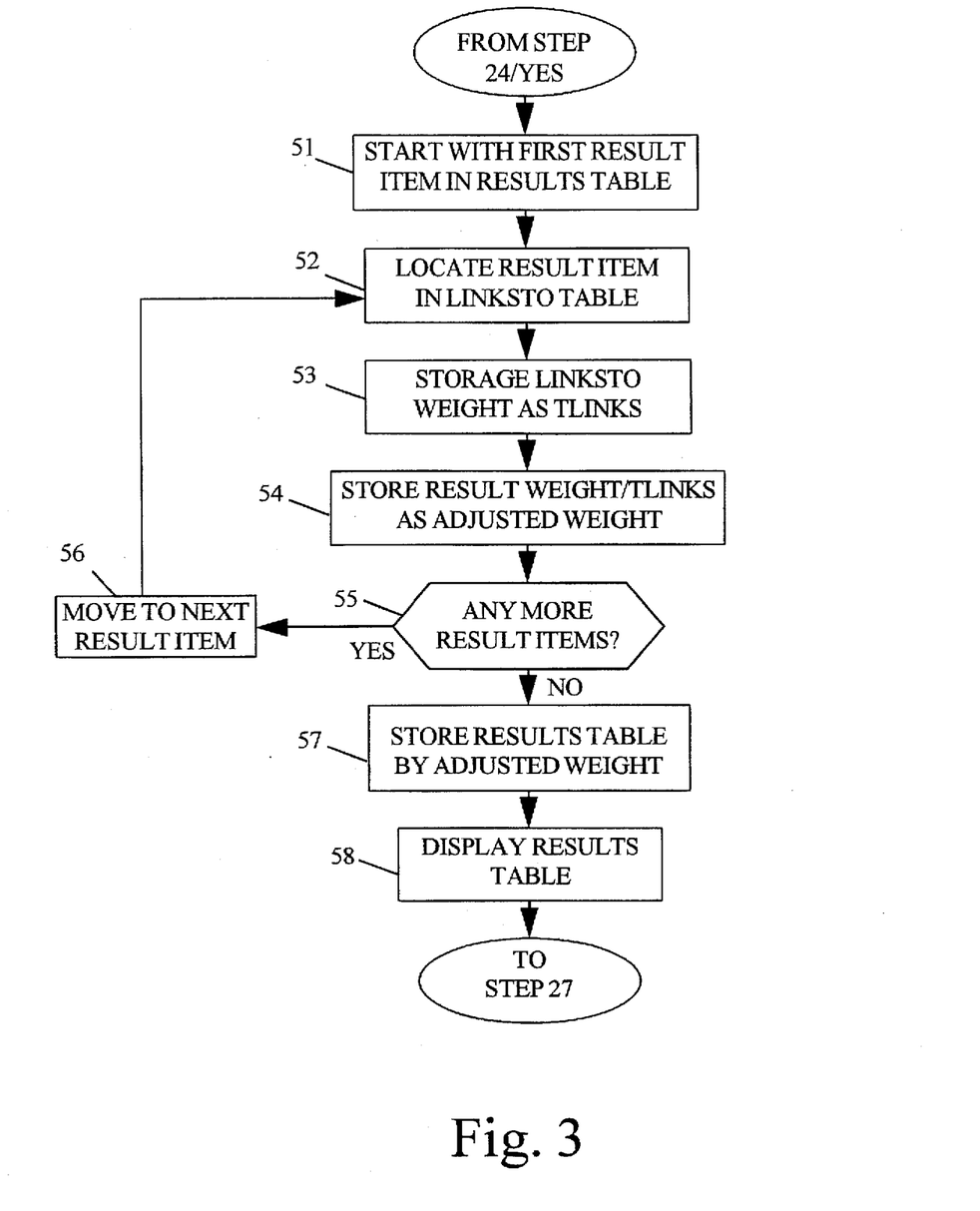
FIG. 3 shows a flowchart describing how the system sorts the RESULTS table that is generated and presents the RESULTS table to the user.

Step 51 is the first step taken in the processing of the steps for sorting and displaying the results, referenced in step 25. The first action taken is to access the first Result Item 402 in the RESULTS table 401. Next, the system locates that Result Item in the LINKSTO table 351 in step 52 (the Result Item will always exist as one of the items in the LINKSTO table), and notes the associated LinksTo Weight 353. In step 53, which is next, the system stores the LinksTo Weight as TLinks 405 in the RESULTS table. Next, in step 54, the system calculates the Adjusted Weight 404 for the current Result Item by dividing the Result Weight by TLinks, and stores the calculated Adjusted Weight 404 in the RESULTS table. In step 55, the system determines if there are any more Result Items in the RESULTS table to process. If there are, flow continues to step 56, where the system accesses the next Result Item in the RESULTS table, and step 52 is performed again. When step 55 is again reached and there are no more Result Items to process, step 57 is performed. In step 57, the RESULTS table is sorted by order of the Adjusted Weight field, and the RESULTS table is presented to the user in step 58. At this point flow continues with step 27, shown in FIG. 2, which is described below.

Of course, steps 51–58 could be placed in a subroutine of a program in order to simplify the process. Similarly, other steps can be placed in subroutines.

UPDATE LINKS TABLE

Figure 4:
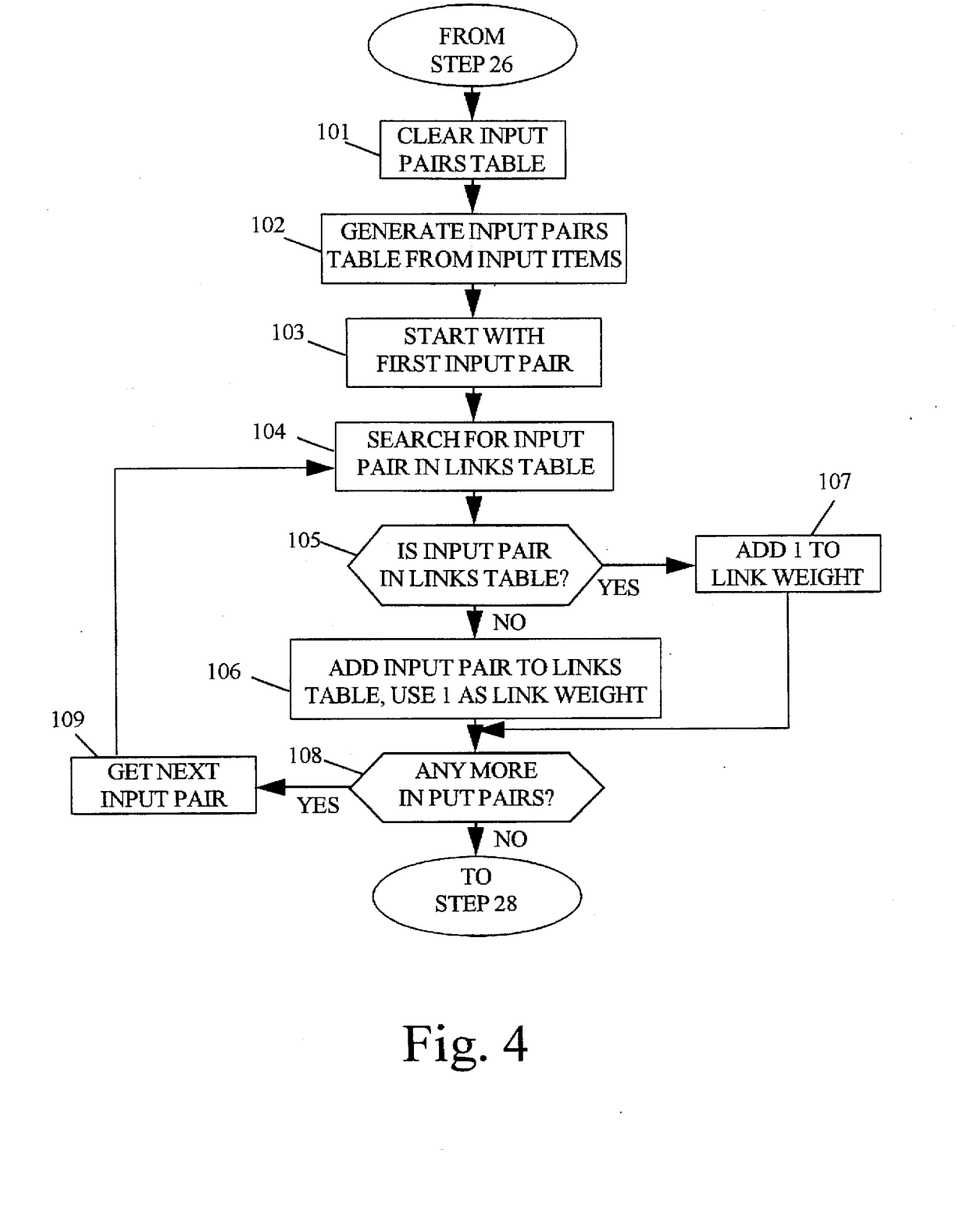
FIG. 4 shows the flowchart describing how the user input that is used to determine the recommendations that are made is also saved to help make recommendations for future users of the system.

Step 101, as shown in FIG. 4, is the first step taken in processing of step 27, shown in FIG. 2. This first step clears the INPUT PAIRS table 451. Then, in step 102, an INPUT PAIRS table 451 (see FIG. 11) is generated, which contains each possible pairing of every item in the INPUT table 201. In the sample INPUT table 201, shown in FIG. 6 which contains three items, the list of input pairs generated and stored in the INPUT PAIRS table 451 would consist of three items, as shown in FIG. 11. Once this list has been generated, system flow continues to step 103, where the system begins processing the first of the input pairs 452 and 453. In the next step 104, the LINKS table 301 is searched for an occurrence of the current input pair. System flow now continues to step 105, where it then branches, depending on whether the current input pair is found to exist in LINKS table 301. In the examples shown in FIGS. 8 and 11, the input pair 452 and 453 does not exist in LINKS table 301, so flow continues to step 106, where the current input pair is added to the LINKS table 301, and a weight of 1 is associated with this new LINKS table entry. If the input pair is found to already exist in LINKS table 301 in step 105, the system flow instead continues to step 107, where the system increments by one the link weight associated with the LINKS table entry that was found. After steps 106 or 107 are processed, step 108 is performed. If there are more input pairs to process in INPUT PAIRS table 451, then step 109 is performed, where the next input pair is accessed, then step 104 is performed. Once all input pairs have been processed, then processing flow returns to step 28 shown in FIG. 2, which is described in the following paragraph.

UPDATE LINKSTO TABLE

Figure 5:
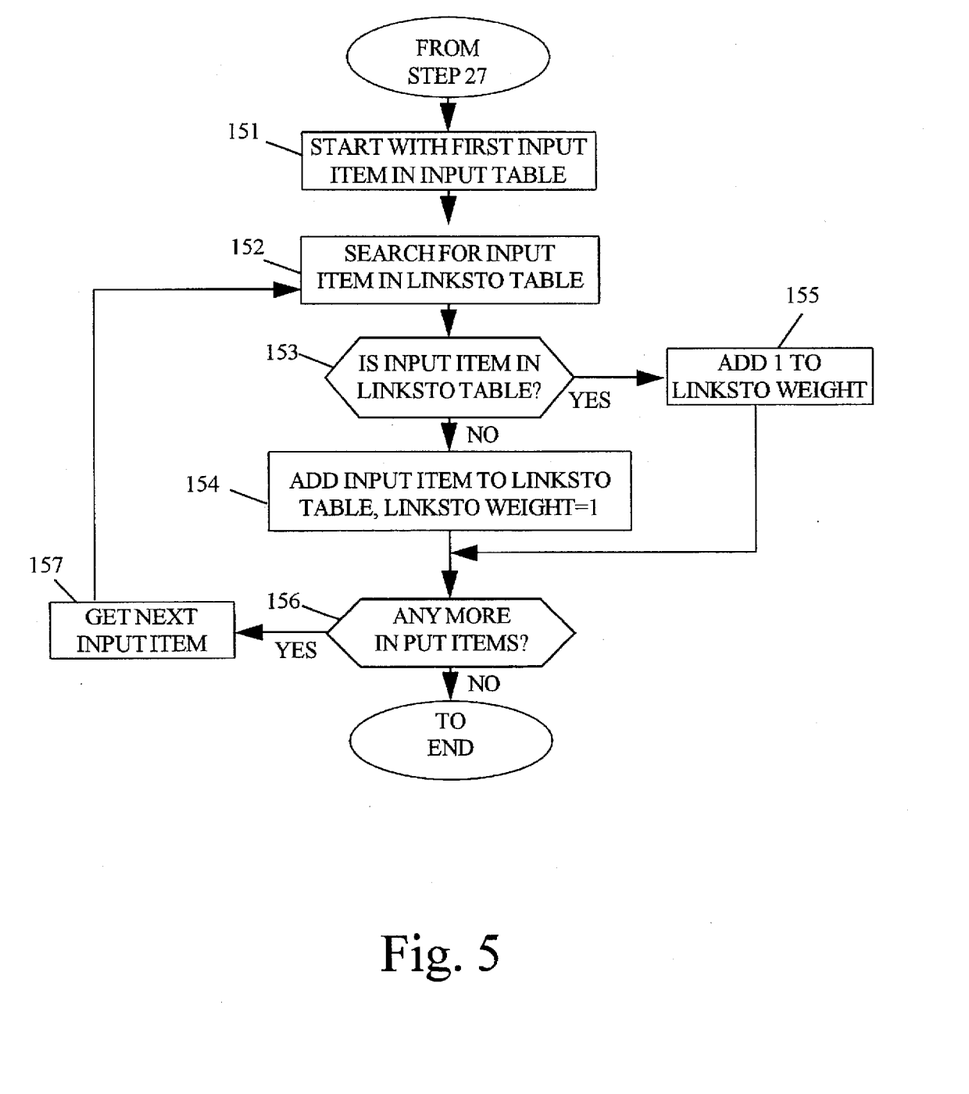
FIG. 5 shows the flowchart describing how the system keeps track of the total number of times individual items have been linked to other items in the NAMES table.

Step 151, as shown in FIG. 5, is the first step taken in the processing of step 28, shown in FIG. 2. The first action taken is to access the first Input Item 202 in the INPUT table 201. Next, LINKSTO table 351 is searched in step 152, to find the Input Item. In step 153, which is next, it is determined if the Input Item already exists in LINKSTO table 351. If the item does not exist, flow continues to step 154, where the Input Item is added to LINKSTO table 351 as a new LinksTo Item 352, with the new LinksTo Weight 353 equal to one. However, if in step 153 the Input Item is found to already exist in LINKSTO table 351, then step 155 is performed instead. In step 155, the system adds one to the LinksTo Weight associated with the item found in step 152. After processing either step 154 or 155, step 156 is performed, where the system checks if there are any more Input Items left to process in the INPUT table. If there are more Input Items, step 157 is performed, where the next Input Item in the list is accessed. Then flow loops back to step 152, where the system again flows through the loop identified by steps 152 to 156. When all items in the INPUT table have been processed through the loop, then flow continues from step 156 back to the process shown in FIG. 2. At this point, just after step 28, shown in FIG. 2, the customer's input has been entirely processed, and program flow ends.

EXAMPLES

The possible uses of the system can be grouped into two main classes. The first class relates to uses where the system only assists the user in narrowing down the number of choices that the user is faced with, at which point the user looks more closely at the items that are suggested, or data associated with the items, before making final selections. An example of a use in this first group would be one which helps users identify reproductions of paintings they may wish to purchase. The system would suggest a list of paintings, and the user would then look at each of the recommended items. The user would then make his final decision on which images to purchase based upon the appeal of the reproductions.

The second class of possible uses is where the user makes a purchase (or rental) of an item recommended by the system based solely on the system's recommendations. Uses that fall into this category would tend to be centered around items that were of small or minimal cost; the best example would be rental movie video tapes. Renters of movies do not generally want to see a few minutes of the movie before they will rent it, although this is an occasional practice, in that generally movie highlights are not shown on screens inside the stores. In any event, rental of movies or, e.g., the selection of a wine, are good examples of uses of the Similarities Engine where the user would more or less "take the system's word", and try the item that was recommended based almost solely on the fact that the system recommended it. A variation on this second type of implementation would be a system that used the Similarities Engine to make ongoing selections of musical recordings for playback to the user, where the recommendations made would be used as input by an automatic system such as a jukebox to actually retrieve and play the recordings. Note that in such a system, the jukebox could select items at random when first started up, and the user would simply have to press a button marked, for example, "I like that" in order to build the INPUT table.

The following is a demonstration of the operation of the system as it might be implemented for a database of video tape movies that are available for rental in a video tape rental store. It tracks the operation of the system as one hypothetical user operates the system and is provided with the results.

First, RESULTS table 401 is cleared of any entries remaining from a previous use of the system. This action occurs automatically and requires no input from the user. The user is then prompted to enter a list of items that the user knows are all to his liking. The items can be the user's all-time favorites; but this will not always be the case. For example, the user might enter a list of his favorite comedy movies, instead. In this case, the end result would be that the system would recommend mostly comedy movies in return, all of which are probably movies that the user would enjoy.

The system begins processing the user's input list one item at a time. As shown in FIG. 6, the user's first Input Item 202 is "Star Wars". The system them searches LINKS table 301, shown in FIG. 8, for any occurrences of the current input item. Since the LINKS table is made up of pairs of items, it consists of two columns of item names (or codes). The current Input Item may exist in either column, so both columns must be searched. In this demonstration case, the current Input Item, "Star Wars", would be found in the LINKS table.

The first occurrence of "Star Wars" is linked with "Back to the Future", which is referred to as the Input Item's Match. Next, the system searches for the Match in the RESULTS table. Since this is the first Match that has been found, and the system is processing the first Input Item, RESULTS table 401 is still empty, so the Match (i.e., "Back to the Future") is not found in the RESULTS table. The name of the Match, (i.e., "Back to the Future"), is stored in the RESULTS table as a Result Item, and a Result Weight 403 of 120 is assigned to that Result Item.

The system then continues searching LINKS table 301 for the first Input Item, "Star Wars", starting just below the entry where the first occurrence was found. The system finds three more Matches for "Star Wars" in LINKS table 301; these are "The Empire Strikes Back", "The King and I", and "The Sound of Music". Therefore, the loop described by steps 15–21, shown in FIG. 2, is repeated three more times. In each case, the Match name is not found in the RESULTS table (it can't be, since the first item in the Input List is being processed), so step 19 is executed instead of step 20.

After the system finishes executing the loop for the fourth time, where the match that is found is "The Sound of Music", it again searches LINKS table 301 for "Star Wars", but does not find any more occurrences of it. Step 15, "Input Item found?" is thus NO, and the system executes step 22 instead.

Step 22 determines whether there are more input items in INPUT table 201. In this sample case, the user has provided three Input Items, so the answer to this question is True. The next Input Item 203 is "The Terminator". The system now loops back to step 14 once again, and begins searching LINKS table 301 for the "The Terminator" from the top of the table. "The Terminator" is found in LINKS table 301, so the system follows the loop as it did before, through steps 15–17.

The first Match found in LINKS table 301 for "The Terminator" is "Back to the Future". However, since "Back to the Future" already is stored in RESULTS table 401, the system flow continues to step 20 instead of 19 as it has in the previous passes through the loop. The system now, in step 20, adds the Match's ("Back to the Future"'s) weight, which is 122, to the RESULTS table weight for "Back to the Future", which is 120. The result, 242, is stored replacing the old RESULTS table weight of 120.

The system proceeds through the loop two more times, since "The Terminator" exists in the LINKS table linked to two more movies, "Top Gun" and "Total Recall". After the two passes through the loop, the system again reaches step 15, but this time the answer is NO, since there are no further matches in LINKS table 301, so it does not continue through the loop again. The system has now processed two of the three items in the user's Input table 201, so step 22 branches to step 23 to process the last Input Item (i.e., "Twelve O'Clock High"). After processing the last item, flow again returns to step 22 where the result is finally NO, since INPUT table 201 contains no more items, therefore flow moves on to step 24.

If no results at all were found to provide to the user, the system would proceed to step 26, and indicate to the user that no recommendations could be made at this time. In this sample case however, results were found, so the system flow continues to step 25.

The system now branches to the section of the system, namely, steps 51–58 shown in FIG. 3, that sorts the RESULTS table that was generated, then displays this RESULTS table to the user (see FIG. 3 to continue tracing the system flow, and see the discussion above of steps 51–58).

The items in the RESULTS table with the highest weights are the items that will be most strongly recommended to the user, so the table is sorted in this manner. While the RESULTS table can be sorted by either the Result Weight or the Adjusted Weight, it will generally be preferable to sort by the Adjusted Weight, as shown in FIG. 10, to eliminate very popular items from dominating the recommendations. The user is then shown the resulting recommendations on the screen, and can also be given the chance to print out a hard copy of the list. The user can then use the list as the basis of subsequent decisions as to which of the items the user would like to sample.

After sorting and displaying the recommendations, the system now branches to the section of the system, namely, steps 101–109 shown in FIG. 4, that uses the information in INPUT table 201 to increase the accuracy of the system LINKS table (see FIG. 4 to continue tracing the system flow, and see the discussion above of steps 101–109). Since there are three Input Items in this sample case, three Input Pairs are generated: "Star Wars"+"The Terminator", "Star Wars"+"Twelve O'Clock High", and "The Terminator"+"Twelve O'Clock High".

The first, and current, Input Pair in the present example is "Star Wars"+"The Terminator". Here, at step 105, the current Input Pair does not exist in LINKS table 301, so system flow continues in the False direction to step 106. If the current Input Pair had been found in LINKS table 301, the link weight for that Link Pair in the LINKS table would have been increased by 1 in step 106. Instead, a new Link Pair is added to LINKS table 301, and the Link Pair is given a link weight of 1.

In step 108 another Input Pair "Star Wars"+"Twelve O'Clock High" is present in INPUT table 451, which is retrieved in step 109. The loop, consisting of steps 104–108, is again executed and the pair added as a link in LINK table 301. Similarly, the last Input Pair "The Terminator"+"Twelve O'Clock High" is added to LINK table 301.

In the present example, INPUT PAIRS table 451 contains no more Input Pairs, so system flow returns to step 28, shown in FIG. 2. If there had been more Input Pairs, system flow would have continued on to step 108 and looped through steps 103–108 as many times as necessary.

The system now branches to the section of the system, namely, steps 151–157 shown in FIG. 5, that uses INPUT table 201 to adjust the contents of LINKSTO table 351. This table is used in step 25 to sort RESULTS table 401 in such a way that the results presented to the user more closely represent that user's particular taste range, instead of being more a list of the most overall popular items, along the lines discussed above for steps 151–157.

While the embodiments set forth above are discussed in terms of recommending videotape movies, the present invention can also be used to recommend other items, such as music selections (i.e., albums/CDs), electronically delivered still images, electronically delivered periodical information, information in the form of electronic text messages (i.e., E-mail, bulletin boards, news groups, etc.), designer wallpapers and fabrics, games, such as video games and board games, and other point-of-sale items (i.e., wines, books, etc.).

The present invention has been described in connection with the preferred embodiments, and in not intended to be limited only to the above-described embodiments.

What is claimed is:

1. A computer implemented method of recommending items to a current user, comprising the steps of:

creating a master list of items from which a plurality of users may select;

accepting from the current user an input list of items which the user enjoys;

storing said input list;

generating all combinations of pairs of items in said input list, and identifying each of said pairs as a link between two items from said master list, wherein each link includes a first part corresponding to a first item and a second part corresponding to a second item;

storing in a LINKS table each generated link, wherein duplicate links generated by more than one user are represented by a weighting number stored in association with the link;

identifying all items in the input list that exist as the first part of a link in the LINKS table;

identifying for each of the identified items in the input list, the corresponding second part of the link in the LINKS table as a result item;

generating, for each of the identified items in the input list, a result weight based on the weighting number associated with said link associated with the identified item;

generating a RESULTS table, said RESULTS table containing a list of all the result items and respective result weights; and presenting said result items contained in the RESULTS table to the current user.

2. A method according to claim 1, wherein said presenting step comprises sorting the result items based on the result weights.

3. A method according to claim 1, wherein in the step of generating the RESULTS table duplicate results items are included only once in said RESULTS table, and the total of all duplicate result weights are added together the sum stored as the result weight.

4. A method according to claim 2, further comprising the step of:

generating an adjusted weight for each result item in the RESULTS table by dividing the result weight by a sum of all link weights for links associated with the result item.

5. A method according to claim 4, wherein the step of sorting the result items sorts based on the adjusted weights of the result items.

6. A computer implemented method of recommending items from a set of items, each of the items in the set related to other items in the set by a link having a first part corresponding to the item and a second part corresponding to a related item, the method comprising the steps of:

accepting an input list of items;

generating all combinations of pairs of items in the input list and identifying each of the pairs as a link between two items including a first part and a second part;

accepting an item specification;

searching the set of links for one or more links having a first part corresponding to the specified item;

determining from the second part of said one or more links one or more items related to the specified item; and recommending at least one of the determined related items.

7. A method of recommending items, according to claim 6, wherein the relationship between the two items is weight factor based on a number of generated duplicate links.

8. A method of recommending items, according to claim 7, wherein the items provided in the recommending step are those having the largest weight factor.

9. A computer system for recommending items, comprising:

item storage means for storing an input plurality of items;

combination generation means for generating all combinations of pairs of items in the input plurality of items;

link storage means for storing links representing the generated combinations, each link relating each one of the input plurality of items to another of the input plurality of items;

means for inputting at least one specified input item;

a processor for determining, for the specified input items, another one or more of the input plurality of items linked to the specified item; and means for recommending the determined one or more linked items.

10. The apparatus according to claim 9, further comprising:

means for storing names of items, wherein at least one of the stored names is selectable and said input means inputs an item based on the selected stored names.

11. The apparatus according to claim 10, wherein the stored names comprise at least one of a title and a name of a star artist.

12. The apparatus according to claim 9, wherein the processor determines a weight for each link based on the number of times a combination of pairs of items is generated, and the means for recommending one or more linked items is responsive to the weight of the link.

13. The apparatus according to claim 9, wherein each of the plurality of input items corresponds to one of a videotape, a music selection, and a still image.

14. The apparatus according to claim 9, wherein the processor determines an adjusted weight for each link by dividing the ink weight by the total number of links associated with each stored item.

* * * * *